July 19, 1955    H. M. BROWN    2,713,209
LAP THICKNESS METERS
Filed Aug. 24, 1953
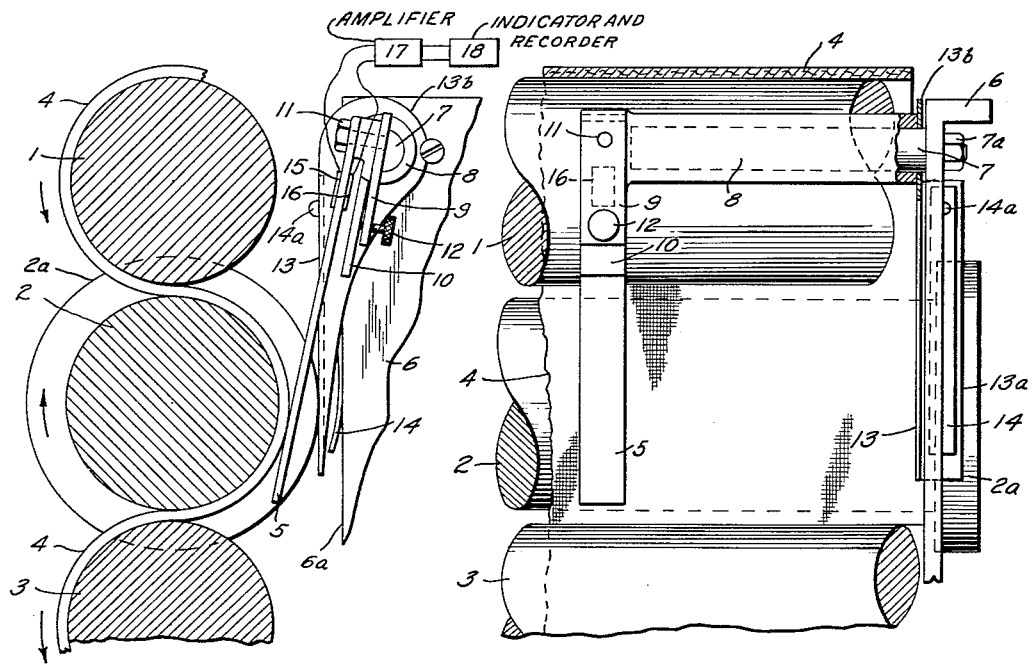
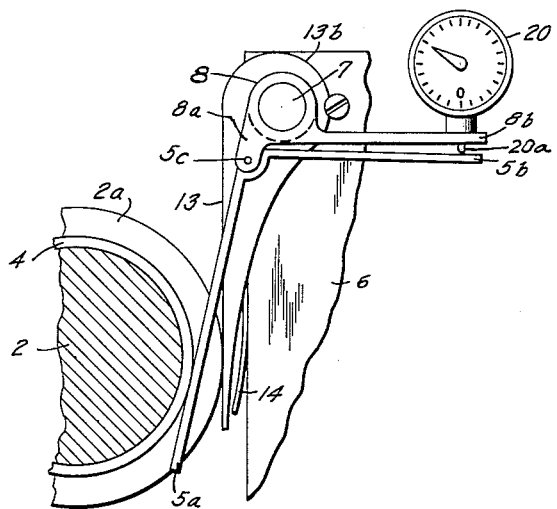
INVENTOR
HUGH M. BROWN
BY Ralph B. Stewart
ATTORNEY

United States Patent Office 2,713,209
Patented July 19, 1955

2,713,209

LAP THICKNESS METERS

Hugh M. Brown, Clemson, S. C., assignor to The Clemson Agricultural College of South Carolina, Clemson, S. C., a corporation of South Carolina Application August 24, 1953, Serial No. 376,076

4 Claims. (Cl. 33—172)

This invention relates to devices for measuring the thickness of a fibrous web, such as the lap in a picker.

While my measuring device is especially designed for use in the measurement of the thickness of a lap on the calender roll of a picker, it may be used in any similar situation where it is desired to measure or indicate the thickness of a fibrous web passing over a base surface.

An object of my invention is to devise a lap meter in which the thickness of the lap is measured by engagement of a feeler element with the lap as it passes over a base surface, and including means to prevent the indications of the meter from being influenced by slight movements of the base surface at right angles to the lap at the point of engagement of the feeler element.

Other objects of the invention will become apparent from the following description of two forms of my invention, especially designed for the measurement of the thickness of a lap on the center calender roll of a picker.

In the drawing, Figure 1 is a front elevational view of the end portion of three calender rolls of a picker, showing a lap follower or feeler element engaging the lap on the center roll and actuating a strain gauge for indicating the thickness of the lap;

Figure 2 is a view of Figure 1 as seen from the left of Figure 1; and

Figure 3 is a view similar to Figure 2 but showing a modified form of my invention in which movement of the feeler element operates a mechanical indicator.

Referring to the drawing, the three calender rolls of a conventional picker machine are shown at 1, 2 and 3. These rolls are supported in suitable bearings, not shown, and are driven so that rolls 1 and 3 rotate in anti-clockwise direction while roll 2 rotates in a clockwise direction, see Figure 2. The lap 4 passes around the rear face of roll 1, around the front face of roll 2, and then around the rear face of roll 3 in the usual manner. The outer surface of the roll 2 constitutes the base surface which supports the lap at the location of measurement of its thickness. Roll 2 is provided with an end flange or collar 2a which is concentric with the outer surface of roll 2 and the peripheral edge of this collar provides a reference surface which is maintained in fixed relation with respect to the base surface.

A feeler element 5 is arranged to engage the outer surface of the lap 4 as it passes over the front face of roll 2. The mounting for the feeler element 5 is supported from the side wall 6 of the picker frame which is provided with a vertical edge 6a which is spaced from but faces the peripheral edge of the roll flange or collar 2a. The mounting for the feeler element includes a stud 7 rigidly secured to the wall 6 and extending inwardly from the inner face of this wall parallel with the axis of the roll 2. The stud 7 may be secured to the wall 6 by a nut 7a threaded onto a reduced stem on the stud by passing through the wall. Feeler arm 5 is carried at the outer end of a sleeve 8 which is journalled upon the stem 7. The arm 5 is not directly secured to the sleeve 8 but is mounted thereon by means of a rigid arm 9 secured across the end of sleeve 8. A second rigid arm 10 is mounted on the rear face of arm 9 and is held in position on the arm 9 by means of a threaded stud 11 which passes through the upper end portion of the feeler arm 5 and through the upper end portion of the arm 10 and is threaded into the upper end portion of the arm 9. The upper end portion of the feeler arm 5 is supported in contact with a flat face of rigid arm 10 surrounding the stud 11. An adjusting screw 12 is threaded through the lower end portion of arm 9 and engages the rear face of arm 10. By adjustment of this screw, it is possible to vary the angle between the arms 9 and 10 and thereby vary the angle of the feeler arm 5 about the axis of the sleeve 8. It will be understood that as arm 10 is moved away from arm 9 by the screw 12 the stud 11 will bend somewhat about its anchored end and this will change the angle of the feeler arm 5. The feeler arm 5 is frictionally held between the head of the stud 11 and the flat face of the arm 10, so that the feeler arm may be rotated about the axis of the stud 11 to remove it from contact with the lap when this is desired for any purpose, and the feeler arm may be restored to its normal operative position by rotating it back to the position shown in Figures 1 and 2.

Secured to the other end of the sleeve 8 adjacent to wall 6 is another rigid arm 13 which extends downwardly from the sleeve 8 and is provided with a laterally extending portion 13a arranged within the space between the wall 6 and the roll collar 2a and having a flat face arranged to engage the peripheral surface of the collar 2a. As shown in Figures 1 and 2, lever 13 may be formed of sheet metal with the follower portion 13a bent at right angles to the main portion of the lever which is provided with an ear portion 13b surrounding the stem 7 and being secured to the right end of sleeve 8. The follower portion 13a of lever 13 is held in contact with collar 2a by means of a leaf spring 14 mounted upon the follower portion 13a at 14a and engaging the vertical edge 6a of the wall 6. The spring 14 is of sufficient strength to hold the follower lever 13 in contact with the collar 2a for all lap thicknesses.

Mounted upon the front and rear faces of the feeler arm 5, near the upper end thereof, are two strain responsive electric elements 15 and 16 of the type commonly used in strain gauges. While two elements are shown, only one is necessary. The strain elements are connected to the input of a suitable amplifier represented at 17 and this amplifier controls a suitable indicator and recorder represented at 18. The indicator and recorder may be calibrated in terms of thickness of lap or in terms of weight of lap.

In using the device of Figures 1 and 2, it will be understood that the mounting for the feeler arm 5 will be adjusted so that this arm rests lightly in contact with the outer surface of the roll 2 when there is no lap on the roll. Under this condition, which may be called the datum position of the arm, the indicator will provide zero indication. Feeler arm 5 is made of thin resilient material so that it will be deflected away from roll 2 by the lap. The presence of lap on the roll 2 will deflect the arm 5 away from the roll 2 and will produce relative movement of the lower end of arm 5 with respect to the follower arm or lever 13, thereby bending arm 5 and producing stress in the stress sensitive elements 15 and 16. The amount of the stress, which is proportional to the thickness of the lap, will be indicated by the indicator 18.

By mounting feeler arm 5 to move with the follower arm 13, the device responds only to relative movement between the arm 5 and the lever 13. Thus, if the roll 2 should for any reason shift a small distance either towards or away from the arm 5, there will be a corresponding shift in the reference surface 2a, and there will be no change in the indication of the device 18 where there is no change in the thickness of the lap 4.

In Figure 3 I have illustrated a modified form of lap meter in which the movement of the feeler element operates a mechanical indicator. The mounting for this arrangement is quite similar to the arrangement illustrated in Figures 1 and 2, and elements serving the same functions in the two modifications are indicated by the same reference numerals. Only one picker roll has been shown in Figure 3.

The mounting for the feeler element includes the stud 7, the sleeve 8 surrounding the stud and having the follower arm 13 secured thereto in the manner described in connection with Figures 1 and 2, the follower arm 13 being maintained in contact with the collar 2a on the roll 2 by means of the leaf spring 14.

The outer end of sleeve 8 is provided with two rigid arms, a short downwardly extending arm 8a, and a longer horizontally extending arm 8b. The feeler element in Figure 3, instead of being formed of a thin flexible arm, is formed of a rigid bell-crank lever 5a—5b pivotally secured to the arm 8a at the point 5c, so that the arm 5a can engage the outer surface of the lap 4 on the roll 2 and the arm 5b is located below the arm 8b. Supported on arm 8b near its outer end is a suitable distance indicator 20 of well known construction having a plunger 20a extending through the arm 8b and having contact with the arm 5b of the feeler element. The plunger 20a is spring-biased in well known manner to urge the arm 5b downwardly and thereby press the arm 5a into contact with the lap 4 or into contact with the surface of the roll 2 where the lap is absent.

The arrangement shown in Figure 3 is designed so that with no lap on roll 2 and the feeler arm 5a in direct contact with the surface of roll 2, meter 20 provides an indication of zero. The presence of lap on the roll 2 causes the bell-crank 5a—5b to rotate in an anti-clockwise direction according to the thickness of the lap, and this rotation actuates the meter 20 to indicate the thickness of the lap, or the weight of the lap, depending upon the calibration of the indicator.

It will be understood that some surface other than the peripheral surface of the collar 2a may be used as a reference surface. For example, the follower arm 13 may be arranged to have direct contact with a section of the roll 2 which is outside of the area covered by the lap. The reference surface should be one which maintains a fixed relation with respect to the base surface and which partakes of the same lateral movement as the base surface.

In both forms of my invention, the thickness of the lap is measured by means of a feeler element engaging the lap resting upon a base surface, the feeler element being mounted to move with a follower element which engages a reference surface adjacent the feeler element and which is maintained in fixed relation with respect to the base surface, and an indicator is arranged to respond to relative movement between the feeler element and the follower element.

I claim:

1. Apparatus for measuring the thickness of lap on a picker machine, comprising a follower arm pivoted for movement about a given axis and having one end portion thereof arranged to engage the surface of said roll outside of the area covered by said lap and being mounted to follow lateral movements of said roll, a feeler member comprising a second arm mounted for pivotal movement about the same axis as said follower arm to partake of the same lateral movement as said follower arm and having an end portion thereof arranged to engage the surface of lap passing over said roll and to be deflected away from the surface of said roll in dependence upon the thickness of lap, and a mechanically operated distance indicator carried by one of said arms and having a movable operating member controlled by the other arm in response to relative movement between said arms.

2. Apparatus for measuring the thickness of lap on the calender roll of a picker machine, comprising a shaft member, means mounting said shaft for turning about its axis and arranged parallel with and adjacent said calender roll, a follower arm secured to said shaft near one end thereof and arranged to engage a portion of said roll outside of the area covered by said lap, means for resiliently urging said follower arm into contact with said roll, a feeler arm carried by said shaft and arranged to engage the surface of the lap on said roll, and indicator means responsive to relative angular movement between said arms about the axis of said shaft.

3. Apparatus according to claim 2 and including means for adjusting the angular datum position of said feeler arm about the axis of said shaft with respect to the position of said follower arm.

4. Apparatus according to claim 2 wherein said feeler arm comprises a thin flexible arm arranged to be flexed away from said roll by said lap in proportion to the thickness of said lap, and wherein said indicator means comprises a strain-responsive element mounted upon said feeler arm at a point of flexure therein, and an indicator controlled by said strain-responsive element for indicating the thickness of said lap.

References Cited in the file of this patent

UNITED STATES PATENTS

| 1,300,257 | Felland | Apr. 15, 1919 |
| 1,946,924 | Allen | Feb. 13, 1934 |
| 2,316,203 | Simmons | Apr. 13, 1943 |